Patented Jan. 10, 1939

2,143,395

UNITED STATES PATENT OFFICE 2,143,395

MANUFACTURE OF CEMENT

Mikael Vogel-Jorgensen, Frederiksberg, near Copenhagen, Denmark, assignor to Separation Process Company, Catasauqua, Pa., a corporation of Delaware No Drawing. Application June 2, 1937, Serial No. 145,990. In Great Britain June 8, 1936

4 Claims. (Cl. 209—11)

This invention relates to the manufacture of Portland cement and special modifications thereof in which compounds of calcium and silica are the principal constituents. It has to do with the preparation of cement raw material mixtures or lime components thereof from inferior or unsuitable natural materials. It is especially concerned with and adapted to the froth flotation treatment of argillaceous limestones, marls and chalks, in which the clay compounds, at least, are naturally finely divided or crystallized, or must be finely ground, and when suspended in flotation pulps of normal dilution, occur principally in the slimes and include colloidal matter and matter having colloidal behavior.

The materials to which process is particularly directed, may be further described as including in the natural or pulverized slimes various finely divided clay minerals, including hydrated compounds and particularly silicates of alumina. The abundance of the alumina compounds makes such materials unsuitable for the manufacture of modern cements, such as the "sulphate-resisting" and "low-heat" types, because the compound tricalcium aluminate is relatively highly soluble and contributes largely to the heat of hydration. The materials contemplated are further of the types in which at least a substantial proportion of the calcite is naturally of fine crystal structure or must be ground to such extreme fineness to separate it physically from the other minerals, that desliming or classification methods involve prohibitive waste and in some instances are completely ineffective to make a substantial change in chemical composition.

It is among the purposes of the invention to enable the cement chemist to derive economically from such inferior or unsuitable materials either a satisfactory lime component of a raw material mixture; or an ultimate mixture, or a substantial part thereof, when the material contains the other essential constituents in reasonable abundance. To this end, the materials are processed to recover a substantial proportion of the calcite and to separate and reject undesirable minerals and the alumina compounds, at least to a degree that the finished cement will not exceed a desired maximum proportion of tricalcium aluminate. It is a further purpose to avoid waste of useful minerals and to economize in flotation equipment and reagent consumption. For these reasons, the grade of the concentrate, at or below the economical upper limit of purity, is established with relation to the composition of the available materials so that the rejects will contain the least possible quantity of useful minerals. Thus, if the purpose is to obtain a satisfactory lime component to be combined with a natural or modified siliceous component, the proportions of the silica, iron, and alumina in the latter will govern the grade of the calcite concentrates that must be obtained. It will be understood that if the clay compounds are not overly abundant, either a part only of the lime bearing component need be treated by froth flotation, or a limited desliming may be practiced, and the slimes utilized or discarded, depending upon their composition. Likewise, for the preparation of complete, or substantially complete, mixtures from a single available material containing all the essential constituents in substantial abundance, all or a considerable proportion of the slimes must be subjected to flotation to provide for the elimination of the excess alumina compounds.

I am aware that froth flotation has been employed successfully heretofore in the commercial production of cement from inferior raw materials, but the present process is directed to the more economical processing of the peculiar materials described above. It is well understood in the art of flotation that the presence of slimes in a flotation pulp makes effective separation exceedingly difficult, normal flotation methods being ineffective to produce commercial results in the treatment of cement raw materials of the class described.

I have discovered that the separation of the calcite by froth flotation in raw materials in a fine state of subdivision is improved if the materials are heated before they are subjected to the flotation step. The temperature to be used depends upon the materials, the duration of the heating and the extent to which alteration in the proportion or composition of any substance in them is necessary to produce the results desired. The materials should not be elevated or maintained at a temperature sufficient to alter the calcite by the loss of $CO_2$, and further, the heating should not be sufficient materially to elevate the hydroxyl ion concentration, the best results being accomplished when the alkalinity does not exceed pH8, although commercial results have been obtained when the alkalinity has reached pH8.3.

By way of example, an argillaceous marl having a calcium carbonate content of 64% by titration was treated by froth flotation, all examples being uncleaned rougher concentrates. It was desirable to raise the titration figure of this marl to 84% in order to employ it as a lime component in combination with an available siliceous material for the manufacture of Portland cement. When the marl was treated by normal flotation methods, it was only possible to raise the lime content to a carbonate titration figure of 77% without reducing the capacity of the flotation cells very materially. Upon heating the material to 100° C. for half an hour before the flotation treatment, the titration figure after flotation was raised to 80% and became 84% when the material was heated to 200° C. for half an hour. With the use of higher temperatures, preferably not exceeding 350° C., the titration figures were further elevated, reaching a maximum of 92% $CaCO_3$. Increasing the duration of heating likewise improved the grade of the concentrate, thus upon heating to 100° C. for two hours approximately the same results were obtained as when the material was heated to 150° C. for half an hour.

The following experimental example will illustrate the preferred practice of the invention and will indicate how the process may be applied to advantage:

Another argillaceous marl, containing hydrated clay compounds, principally compounds of alumina, was ground to pass through a standard 100 mesh sieve. The pH of the pulp immediately before flotation was 7.35. The collecting reagent used was oleic acid of 98% acid value, and the frother was a mixture of branched and straight chain aliphatic monohydric alcohols boiling between about 152° C. and 162° C. obtainable along with methanol by the catalytic hydrogenization of carbon oxides. The separation required 0.758 pounds of oleic acid and 0.1 pound of frother per ton of heads. The flotation time was 4 minutes and 45 seconds.

The results were as follows:

|  | Grams | Percent weight | Titration $CaCO_3$ | Grams $CaCO_3$ | $CaCO_3$ distribution |
|---|---|---|---|---|---|
| Heads | 580 | 100.0 | 57.7 | 334.4 | 100.0 |
| Conc | 367 | 63.3 | 69.6 | 255.2 | 76.3 |
| Rejects | 213 | 36.7 | 37.2 | 79.2 | 23.7 |

It will be seen from the above that the concentrate is below cement raw material composition, and that the rejects involve a substantial loss of calcite.

A quantity of the same original material was maintained at a temperature of 350° C. for 20 minutes. After cooling and suspension in water, the pulp was allowed to cool to approximately room temperature. It was subjected to froth flotation under identical conditions. The pH of the pulp immediately prior to flotation was 7.85. The same quantity of oleic acid was used but the frother was increased to 0.2 pounds per ton. Flotation was completed in 2 minutes and 45 seconds a reduction of 2 minutes, demonstrating that the number of flotation cells required can be reduced proportionately. The froth concentrate was more brittle and contained less water, filtration being completed in approximately half the time of that of the unheated material.

The flotation results were as follows:

|  | Grams | Percent weight | Titration $CaCO_3$ | Grams $CaCO_3$ | $CaCO_3$ distribution |
|---|---|---|---|---|---|
| Heads | 568 | 100.0 | 57.7 | 327.4 | 100.0 |
| Conc | 316 | 55.6 | 85.1 | 269.0 | 82.2 |
| Rejects | 252 | 44.4 | 23.2 | 58.4 | 17.8 |

In the general use of the process, a further advantage is obtained through the heating of raw material in that the water content of the slurry formed from the concentrates may be considerably reduced. These concentrates are often treated in a settling basin, or thickener, after flotation in order to remove the bulk of the water. The slurry taken from the settling basins should have as low a water content as will permit convenient handling, as it must be burned to cement and an excessive water content is obviously wasteful in fuel. In the case of one raw material that had been heated to 150° C. before being subjected to flotation, the water content in the slurry was lowered from 47% to 40%, by comparison to unheated raw materials, and in another case where the material had been heated to 300° C. before flotation the water content was decreased from 42% to 37%.

Once the material has been heated, it can be steeped in water for a long time without losing its capacity for being easily separated by flotation with high grade concentrates and for forming a slurry of low water content. The heating of the material can be carried out in rotary kilns or calciners and is preferably accomplished after grinding, although successful results have been obtained prior to final reduction.

I claim:

1. The method of treating lime-bearing cement raw materials containing at least one finely divided clay compound occurring principally as a slime, to eliminate an undesirable quantity of the compound, which comprises heating at least a portion of the materials to a temperature not less than 100° C. and not more than 350° C. and for a time sufficient to alter the clay compound, and then subjecting the materials to froth flotation.

2. The method of treating cement raw materials containing finely divided compounds including an abundance of slimes and at least one of which can be altered by the application of heat, to eliminate quantities of at least one compound, which comprises heating the materials to a temperature not less than 100° C. and not more than 350° C. and for a time sufficient to alter said compound, and then subjecting the materials to froth flotation.

3. The method of treating lime-bearing cement raw materials containing finely divided compounds including an abundance of slimes and at least one of which can be altered by the application of heat, to eliminate quantities of at least one compound, which comprises heating the materials to a temperature not less than 100° C. but below a temperature sufficient to liberate substantial quantities of $CO_2$ and for a time sufficient to alter said compound, and then subjecting the materials to froth flotation.

4. The method of treating lime-bearing cement raw materials containing finely divided compounds including an abundance of slimes and at least one of which can be altered by the application of heat, to eliminate quantities of at least one compound, which comprises heating the materials to a temperature not less than 100° C. and below a temperature and time interval sufficient to liberate substantial quantities of $CO_2$ to alter said compound, and then subjecting the materials to froth flotation in a pulp having an alkalinity not substantially exceeding pH8.

MIKAEL VOGEL-JORGENSEN.